(No Model.)

J. X. MILLS.
FEED RACK.

No. 427,343. Patented May 6, 1890.

Witnesses.
E. P. Ellis,
A. Stevens Pattison

Inventor:
Job X. Mills,
per F. A. Lehmann,
atty

UNITED STATES PATENT OFFICE.

JOB X. MILLS, OF PINE VILLAGE, INDIANA.

FEED-RACK.

SPECIFICATION forming part of Letters Patent No. 427,343, dated May 6, 1890.

Application filed February 8, 1890. Serial No. 339,673. (No model.)

*To all whom it may concern:*

Be it known that I, JOB X. MILLS, of Pine Village, in the county of Warren and State of Indiana, have invented certain new and useful Improvements in Feed-Racks; and I do hereby declare the following to be a full, clear, and exact description of the invention, such as will enable others skilled in the art to which it pertains to make and use it, reference being had to the accompanying drawings, which form part of this specification.

My invention relates to an improvement in feed-racks; and it consists in the combination and arrangement of parts, which will be more fully described hereinafter, whereby a feed-rack is produced which has its lower portion covered and provided with doors, so as to adapt it to be used for the shelter of hogs or other small animals.

Figure 1:
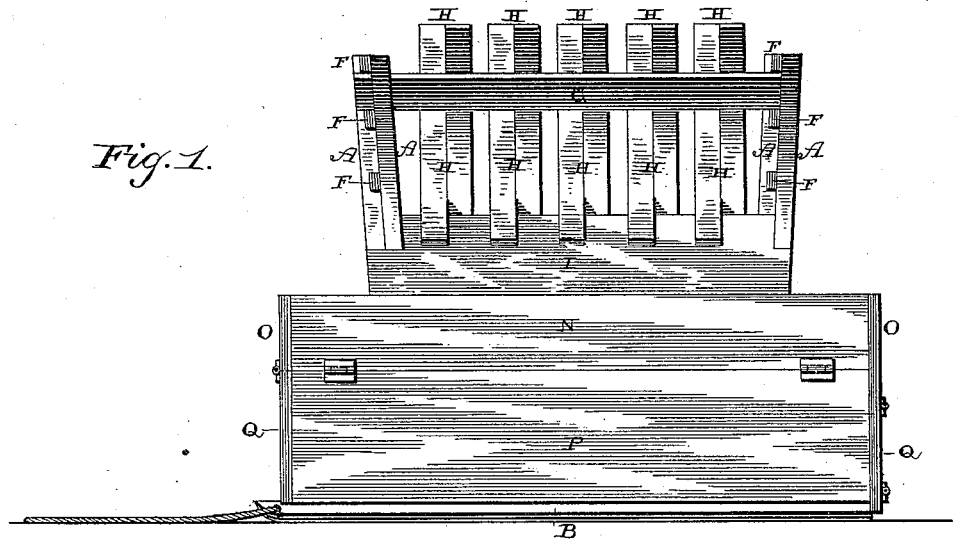
Figure 2:
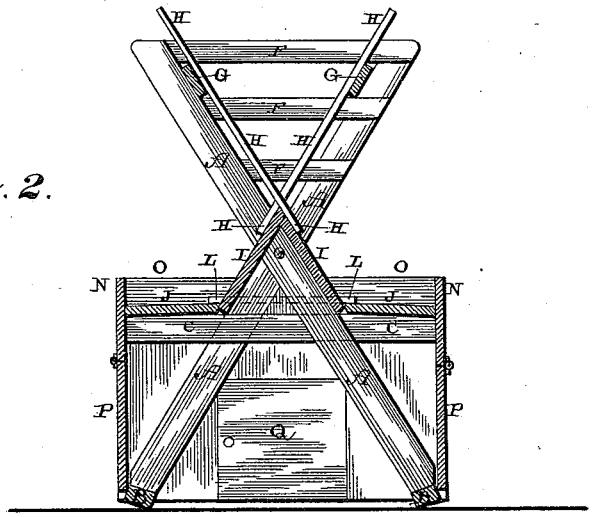

Figure 1 is a side elevation of a feed-rack which embodies my invention complete. Fig. 2 is a vertical cross-section of the same.

A represents the two bars, which are crossed near their centers and securely bolted together. The lower ends of these bars are rigidly secured to the groundsills B, which are so shaped as to adapt them to also act as runners, whereby the rack can be drawn from place to place, as may be desired. At a suitable distance below the point where the bars A cross they are rigidly secured to the horizontal bar G, which not only serves to brace the bars rigidly together, but acts as a support for other portions of the rack. Above the point where the bars cross they are secured together by the short horizontal bars F, which form the ends of the rack.

Secured to the bars A near their upper ends are the horizontal bars G, to which the upper ends of the slats or cleats H are fastened, the lower ends of the cleats being fastened to the boards I, which are secured to the bars A, and which are arranged in the form of an inverted V, so as to divide the feed which falls from the rack and carry it outward upon the feed-boards J. The lower edges of the inclined boards I rest upon the tops of the cross-bars C. The upper edges of these boards I fit in between the lower ends of the cleats H to serve as supports therefor at the same time that they serve to prevent the waste of any of the smaller portions of hay or other material. The feed-boards J are made to fit tightly against the lower edges of these inclined boards I and are secured at their ends to the tops of the cross-pieces C. The spaces between the ends of these boards J upon opposite sides of the cross-bars A are covered over by the board L. Secured to the outer edges of the feed-boards J are the vertical side boards N, which project above the outer edges of the boards J and form flanges to prevent the feed from being knocked off upon the ground. At the ends of the rack outside of the pieces L are secured the end pieces O, which also project so as to form flanges. All of the feed that falls from the rack drops upon the boards J L and is prevented from being wasted by the side and end boards N O. Hinged to the lower edges of the side boards N are the doors P, which extend from one end of the rack to the other, and which may be raised to any desired degree for ventilation, or placed so as to form a tight box. Each of the end pieces O is also provided with a door Q, which may extend wholly or partially across the box, as may be desired, and which can also be opened or closed, as may be desired. These side and end boards inclose the lower portions of the rack and form a box or pen for hogs and other animals, and which also may be opened or closed, as may be desired. By closing all of the doors a tight pen is formed, in which small animals of any kind may be kept.

By means of the construction here shown and described a very cheap, simple, and durable combined rack and pig-pen is formed.

Having thus described my invention, I claim—

The combination of the cross-bars A, the runners B, to which their lower ends are secured, the cross-bars C, secured to the bars A below their centers, the inclined boards I, secured to the bars A, the bars G, the cleats H, the feed-boards J, the side and end boards N O, and the doors Q, secured thereto, substantially as shown and described.

In testimony whereof I affix my signature in presence of two witnesses.

JOB X. MILLS.

Witnesses:
S. C. FENTON,
JACOB SHORT.